United States Patent [19]

Bower

[11] Patent Number: 5,614,597
[45] Date of Patent: Mar. 25, 1997

[54] WET STRENGTH RESINS HAVING REDUCED LEVELS OF ORGANIC HALOGEN BY-PRODUCTS

[75] Inventor: Barton K. Bower, Nottingham, Pa.

[73] Assignee: Hercules Incorporated, Wilmington, Del.

[21] Appl. No.: 355,925

[22] Filed: Dec. 14, 1994

[51] Int. Cl.$^6$ .............................. C08L 71/00; C08L 77/00
[52] U.S. Cl. .................... 525/430; 525/523; 525/540; 528/332; 528/337; 528/341
[58] Field of Search ...................... 525/430, 523, 525/540; 528/332, 337, 341

[56] References Cited

U.S. PATENT DOCUMENTS

| | | | |
|---|---|---|---|
| 2,926,116 | 2/1960 | Keim | 162/164 |
| 3,311,594 | 3/1967 | Earle | 260/77.5 |
| 3,442,754 | 5/1969 | Espy | 162/164 |
| 3,954,680 | 5/1976 | Jansma | 260/2 |
| 4,450,045 | 5/1984 | Hertel et al. | 162/164.3 |
| 4,536,552 | 8/1985 | Killat et al. | 525/451 |
| 4,575,527 | 3/1986 | Dixon et al. | 524/253 |
| 4,689,374 | 8/1987 | Hansson et al. | 525/430 |
| 4,857,586 | 8/1989 | Bachem et al. | 524/845 |
| 4,929,309 | 5/1990 | Bachem et al. | 162/164.3 |
| 4,975,499 | 12/1990 | Bachem et al. | 525/430 |
| 5,017,642 | 5/1991 | Hasegawa et al. | 524/608 |
| 5,019,606 | 5/1991 | Marten et al. | 523/414 |
| 5,171,795 | 12/1992 | Miller et al. | 525/430 |
| 5,189,142 | 2/1993 | Devore et al. | 528/339.3 |
| 5,221,699 | 6/1993 | Nachfolger et al. | 523/423 |
| 5,239,047 | 8/1993 | Devore et al. | 528/339.3 |
| 5,256,727 | 10/1993 | Dulany et al. | 523/414 |

FOREIGN PATENT DOCUMENTS

| | | |
|---|---|---|
| 469891 | 2/1992 | European Pat. Off. . |
| 488767 | 6/1992 | European Pat. Off. . |
| 508203 | 10/1992 | European Pat. Off. . |
| 510987 | 10/1992 | European Pat. Off. . |
| 6220189 | 8/1994 | Japan . |
| 92/19810 | 11/1992 | WIPO . |
| 92/22601 | 12/1992 | WIPO . |
| 93/21384 | 10/1993 | WIPO . |

OTHER PUBLICATIONS

U.S. Ser. No. 08/217,084 filed Mar. 2, 1994, "Process for Making Epichlorohydrin Resins".
U.S. Ser. No. 08/264,804 filed Jun. 23, 1994, "Polyamide–Epichlorohydrin Wet Strength Resins with Reduced Content of Epichlorohydrin–Derived by–Products in–situ Solvent Extraction".

*Primary Examiner*—Ralph H. Dean
*Assistant Examiner*—Randy Gulakowski
*Attorney, Agent, or Firm*—Ivan G. Szanto; Joanne W. Patterson

[57] ABSTRACT

Wet strength resins for paper are prepared by a process comprising the following steps in sequence: (1) reacting a polyamidoamine with an epihalohydrin until the amount of unreacted epihalohydrin present is less than about 10% by weight of the amount of epihalohydrin charged, (2) adding a water-soluble, nonpolymeric amine in an amount of about 0.1 to about 50 mole %, based on the amine in the polyamidoamine, and (3) heating to effect crosslinking. An optional amine additive reaction step can be included after step (2). A nonhalogen acid such as sulfuric acid can be added toward the end of the crosslinking step to decrease the total organic halogen content and increase the wet strengthening effectiveness.

34 Claims, No Drawings

WET STRENGTH RESINS HAVING REDUCED LEVELS OF ORGANIC HALOGEN BY-PRODUCTS

This invention relates to a process for making epihalohydrin-modified polyamidoamine resins used as wet strength agents for paper.

BACKGROUND OF THE INVENTION

Synthetic water-soluble epihalohydrin resins, such as polyamidoamine-epichlorohydrin wet strength resins, are used, for example, in manufacturing paper. Procedures for making polyamidoamine-epihalohydrin resins are well known. In order to maximize useful functionality in the final product, these processes typically involve reacting aqueous polyamidoamine with an excess of epihalohydrin to completely convert amine groups in the polyamidoamine (PAA) to epihalohydrin adducts.

During the reaction halohydrin groups are added at the secondary amine groups of the polyamidoamine as shown in the following example, using epichlorohydrin as the epihalohydrin:

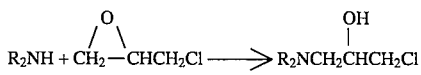

where $R_2NH$ represents a secondary amine group of the polyamidoamine.

After the epihalohydrin has been added and when heat evolution has subsided, the reaction mixture is heated to effect crosslinking and viscosity increase. During this reaction azetidinium ions are formed that impart wet strength to paper by forming a strong crosslinked network with the paper fibers.

The reaction of epihalohydrin with the polyamidoamine also produces nonpolymeric halohydrins that are environmentally objectionable. They include the epihalohydrin residuals 1,3-dihalo-2-propanol (1,3-DHP), 2,3-dihalo-1-propanol (2,3-DHP), 3-halo-1,2-propanediol (3-HPD), and 2-halo-1,3-propanediol (2-HPD). In addition, some epihalohydrin may remain.

It is known from U.S. Pat. Nos. 4,857,586, 4,975,499, and 4,929,309 and European publication 0 334 157 that chlorohydrin residues can be removed from PAA/epichlorohydrin polymers by converting the chlorohydrin residues to epoxide with an inorganic base and then decomposing the epoxide with a nonchlorinated acid to give the ester.

In the patents mentioned above, the chlorohydrin-removing steps are initiated after the increase in viscosity is substantially complete:

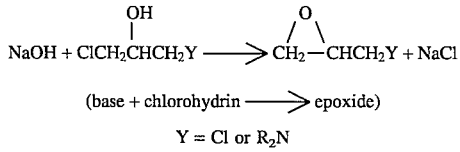

(base + chlorohydrin ⟶ epoxide)

Y = Cl or $R_2N$

In these patents, the product is acidified to its storage pH or the product is added to the papermaking machine as soon as the chlorohydrin-removing steps are completed.

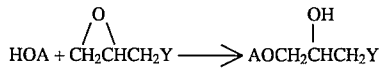

(acid + epoxide ⟶ ester)

U.S. Pat. No. 5,017,642 discloses that epichlorohydrin/polyamidoamine wet strength resins containing a very small amount of organic halogen can be prepared by adjusting the reaction temperature and the molar ratio of the polyamidoamine and epichlorohydrin. The reaction is continued until the total amount of unreacted epichlorohydrin and of the other organic halogen compounds does not change substantially.

It is also known from U.S. Pat. No. 5,019,606, German patent publication DE 41 14 657 and European Patent EP 0 512 423 that chlorohydrin residues can be removed by adding both inorganic bases and amines. The chlorohydrin-removing steps are initiated after viscosity increase has taken place. Adding base when the resin is at or near final viscosity has the disadvantage that the concentration of chloride ion is high, making epihalohydrin residue removal more difficult and requiring more base or more cycles of basification/acidification.

It is known from U.S. Pat. Nos. 3,954,680 and 4,575,527 that storage stability can be provided by adding amines to resins made by the reaction of epichlorohydrin with amines having no functionality other than hydrocarbon functionality. The amine additive is introduced during the final step of the preparation, and reduction in the amount of chlorinated hydrocarbons in the resin product is not disclosed.

It would be advantageous to have a process for preparing polyamidoamine/epihalohydrin wet strength resins that provides reduced levels of unwanted by-products such as 1,3-dihalo-2-propanols and 1-halo-2,3-propanediols while providing equal or greater wet strengthening properties than resins having a higher content of epihalohydrin residuals.

SUMMARY OF THE INVENTION

The process of this invention for preparing a wet strength resin for paper comprises the following steps in sequence: (1) reacting a polyamidoamine with an epihalohydrin until the amount of unreacted epihalohydrin present is less than about 10% by weight of the amount of epihalohydrin charged, (2) adding a water-soluble, nonpolymeric amine in an amount of about 0.1 to about 50 mole % based on the moles of amine in the polyamidoamine, and (3) heating to effect crosslinking.

Optionally, an additional step referred to as the amine additive reaction step can be used between steps (2) and (3) in which the reaction mixture is heated to about 20° to about 40° C. for at least 10 minutes, preferably about 1 to about 8 hours, at a reaction solids level of about 40 to about 60%. This optional amine additive reaction step reduces the amount of amine additive needed to produce a given reduction in epihalohydrin residuals in the final product.

A nonhalogen acid such as sulfuric acid can also be added toward the end of the crosslinking reaction to decrease the total organic halogen content and increase wet strengthening effectiveness.

Amine additives are advantageous compared to inorganic base additives because they decrease epihalohydrin residuals with minimal adverse impact on wet strength activity.

DETAILED DESCRIPTION OF THE INVENTION

The polyamidoamines of this invention are prepared by the method described in U.S. Pat. No. 2,926,116; U.S. Pat.

No. 5,171,795 and European patent application 488,767, all of which are incorporated by reference in their entirety. Preferably the polyamidoamines are prepared by reacting (a) a polyalkylene polyamine having at least one secondary amine group, and (b) a 2–12 carbon, saturated aliphatic dicarboxylic acid or dicarboxylic acid derivative. A polyamidoamine made from adipic acid and diethylenetriamine is most preferred.

The reaction conditions used for step (1) of the process of this invention preferably include using about 130 mole % or less epihalohydrin per mole of amine groups in the polyamidoamine (PAA), preferably about 50 to about 110 mole % and most preferably about 80 to about 100 mole %. About 40 to about 60% reaction solids are used, and the reaction mixture is agitated for about 1 to about 8 hours at about 20° to about 40° C. The reaction is continued until the amount of unreacted epihalohydrin present is less than about 10% of the amount of epihalohydrin charged, preferably less than about 5% of the epihalohydrin charged. Epichlorohydrin is the preferred epihalohydrin.

After the PAA/epihalohydrin reaction step, amine additive is added. The amount of amine additive used is about 0.1 to about 50 mole % based on the moles of amine in the polyamidoamine. Preferably about 0.1 to about 10 mole % amine additive is used, most preferably about 1 to about 5 mole % of amine additive.

Any water-soluble nonpolymeric amine can be used as the amine additive in step (2) of the process of this invention. Nonpolymeric amines are defined as amines having 10 or less carbon atoms and 6 or less amine nitrogen atoms. Suitable amine additives are ammonia ($NH_3$) and organic amines. Aliphatic amines including primary amines, secondary amines, and tertiary amines can be used. The amines can be monoamines or polyamines. Mixtures of amines and compounds containing more than one type of amine functionality can be used. Methylamine, ethylamine, n-propylamine, isopropylamine, n-butylamine, sec-butylamine, tert-butylamine, isobutylamine, glycine, and cyclohexylamine are exemplary of the class of monofunctional primary amines. Ethanolamine (MEA) is the preferred monofunctional primary amine. Ethylmethylamine, diethylamine, dipropylamine, pyrrolidine, and piperidine are exemplary of monofunctional secondary amines. Dimethylamine ($Me_2NH$), morpholine (MOR), and diethanolamine (DEA) are preferred monofunctional secondary amines. Ethyldiethanolamine, triethylamine ($Et_3N$), methyldiethanolamine (MDEA), triethanolamine, triisopropanolamine, and dimethylethanolamine are exemplary of monofunctional tertiary amines. Trimethylamine ($Me_3N$) and N-methylpyrrolidine (NMP) are preferred monofunctional tertiary amines. Hexamethylenediamine (HMDA), N-aminoethylpiperazine (AEP), triethylenetetraamine (TETA), tetraethylenepentaamine (TEPA), are exemplary polyamines. 1,4-Diazabicyclo[2.2.2]octane (DABCO), hexamethylenetetraamine (HMTA), ethylenediamine (EN), diethylenetriamine (DETA), and N-methylbis(3-aminopropyl)amine (MBAPA) are preferred polyamines. Trimethylamine; 1,4-diazabicyclo[2.2.2]octane; ethylenediamine; diethylenetriamine; hexamethylenediamine and morpholine are the preferred amine additives. Tertiary aliphatic amines are more preferred. Trimethylamine is most preferred.

When the amine additive is introduced, it is believed that dihalopropanols (DHP's) are converted to epihalohydrin (epi) and halopropanediols (HPD's) are converted to glycidol. Epihalohydrin or glycidol then react with the polyamidoamine or with additive amine. The reaction of the polyamidoamine with epoxides is facilitated by providing unreacted polyamidoamine amine groups through the use of molar epi:amine ratios of 1.0:1.0 or less. These reactions are illustrated below using epichlorohydrin as an example.

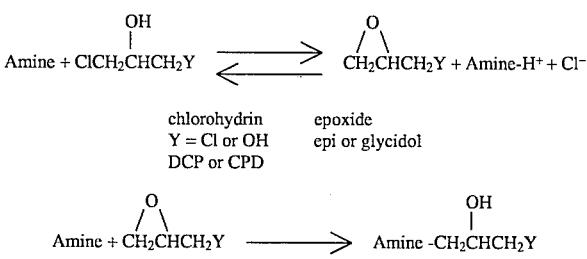

chlorohydrin    epoxide
Y = Cl or OH    epi or glycidol
DCP or CPD

Halide ions react with epoxides, undesirably reforming DHP's and HPD's. The effectiveness of amine additives is increased by using them when little halide ion is present in the reaction mixture. The azetidinium halide functional group that is formed during the crosslinking reaction is the main source of halide ion. Amine additives are introduced before substantial azetidinium halide formation and therefore before the crosslinking step.

For a given level of epihalohydrin residuals in the product, adding amines makes possible the use of a higher ratio of epihalohydrin to polyamidoamine, thereby increasing the wet strengthening chemical functionality of the product resin per unit weight.

After the amine additive has been introduced, an optional amine additive reaction step can be initiated, or the process can proceed to the crosslinking stage within 10 minutes. By amine additive reaction step we mean holding the reaction mixture at the same temperature and % reaction solids as in step (1) for a time period greater than 10 minutes. If the optional amine additive reaction step is used, the reaction solids are higher than the level chosen for the subsequent crosslinking reaction step and/or the reaction temperature is lower than for the crosslinking step. The amine additive reaction step is carried out at about 40 to about 60% reaction solids and at a temperature of about 40° to about 60° C. The time period of the amine additive reaction step is more than 10 minutes and is preferably about 1 to about 8 hours.

The reaction conditions of the optional amine additive reaction step promote conversion of nonpolymeric halohydrins to epoxides and promote the reaction of epihalohydrin and glycidol with the polyamidoamine or with additive amine. Including the optional amine additive reaction step reduces the amount of amine needed to produce a given reduction in the epihalohydrin residuals. The amine additive reaction step provides more time for the amine additive to take effect. Reaction solids are maintained at high levels in order to promote the reactions of dihalopropanols with additive amine and retrieved epihalohydrin with the polyamidoamine. Temperatures lower than the temperatures of the crosslinking step are used in order to minimize the rate of halide ion production and the rates of formation of dihalopropanols and halopropanediols.

Crosslinking reaction conditions are imposed after the amine additive has been added and after the completion of the amine additive reaction step, if any. Reaction solids are about 20 to about 40% and temperatures are about 40° to about 80° C. during the crosslinking reaction step.

Optionally, a nonhalogen acid or acid salt can be added after the amine additive has taken effect and toward the end of the crosslinking reaction. Acid should preferably be added after the amine additive has reduced epihalohydrin residuals to the desired extent, so that the added acid does not hinder the added amine in removing halohydrin. Decreasing the pH of the crosslinking reaction mixture with acid causes an increase in the time and/or the temperature required to reach the target final viscosity. Therefore the conversion of aminohalohydrin groups to azetidinium halide groups is increased. The amount of nonhalogen acid that is added is preferably less than about 50 mole %, based on the moles of amine in the polyamidoamine. More preferably it is about 1 to about 20 mole %, most preferably about 5 to about 10 mole %.

The nonhalogen acid preferably has a pKa of less than 5, preferably less than 4. Suitable nonhalogen acids and acid salts include sodium bisulfate, and methanesulfonic, hydroxymethanesulfonic, benzenesulfonic, toluenesulfonic, sulfamic, sulfuric, phosphorous, phosphoric, nitric, and formic acids. Sulfuric acid is preferred. Added acid decreases total organic halogen content and increases wet strengthening effectiveness.

When the Brookfield viscosity of the final product has advanced to about 10 to about 200 cP for 12.5% solids samples at 25° C., wet strength resin preparation is terminated by dilution, addition of nonhalogen acid, and cooling.

The process of this invention can also be used to reduce epichlorohydrin residuals in the processes for the manufacture of polyamidoamine/epichlorohydrin resins described in European patent application 488,767 and U.S. Pat. Nos. 5,171,795; 5,189,142 and 5,239,047, the disclosures of which are incorporated by referance in their entirety.

The wet strength resins of this invention can be posttreated as described in WO 92/22601, WO 93/2138 and European patent application 510,987, the disclosures of which are incorporated by reference in their entirety.

Although the reaction conditions specified for steps (1), (2) and (3) are preferred ranges for batch processes, a person skilled in the art could convert the process to a continuous process. Times and temperatures may vary, but the selection of suitable conditions is within the purview of one skilled in the art.

In the following examples, Brookfield viscosities were measured using a Brookfield Model LVT viscometer equipped with a spindle guard and a #1 spindle. The spindle was rotated to 60 rpm. Sufficient sample to cover the spindle up to the notch in the shaft was used. The temperature of the sample was 25° C.

Gardner-Holdt viscosities were measured using Gardner-Holdt bubble tubes to contain reaction mixture samples and bubble tubes containing Gardner-Holdt viscosity reference materials as comparators. The temperature of the samples and reference materials was 25° C.

The parameter "% wet/dry effectiveness" used in the Tables in the examples is the percentage retention of wet tensile strength compared to dry tensile strength.

Results for 1,3-dichloropropanol (DCP) content were normalized to 12.5% solids. Resin samples may contain epichlorohydrin, depending on how soon after the run the resin is analyzed by gas chromatography. The results given for 1,3-DCP were adjusted to reflect the assumption that epichlorohydrin, if any, in the sample would quantitatively be converted to 1,3-DCP ("normalized dichloropropanols" in Tables 1 and 2). Thus the 1,3-DCP values are (12.5/solids) × (1,3-DCP$_{found}$+ (128.98/92.53)×Epichlorohydrin$_{found}$).

Aminochlorohydrin to azetidinium conversions were calculated on the basis of the time/temperature history of the crosslinking reaction using experimentally measured Arrhenius activation parameters.

The "standard resin" used for comparisons with the resins of this invention is a polyamidoamine/epichlorohydrin resin made from an adipic acid/diethylenetriamine polyamidoamine that is subsequently reacted with epichlorohydrin in 30% molar excess over the amine in the polyamidoamine. The standard resin had a dichloropropanol content of 10,000 ppm.

When reference is made to "total organic halogen" in a product, the term refers to covalently bonded halogen, which includes both epihalohydrin residuals and polymeric halogenated hydrocarbons. Polymeric halogenated hydrocarbons are wet strength polymer molecules with attached halohydrin groups. When adsorbable organic halide (AOX) is measured analytically, it is an estimate of total organic halogen. A Mitsubishi TOX 10 analyzer was used to measure AOX.

COMPARATIVE EXAMPLE 1

This example describes the preparation and properties of a polyamidoamine/epichlorohydrin resin made without the amine additive of this invention.

A chlorohydrin-substituted polyamidoamine was prepared by adding epichlorohydrin (95 mole %, based on amine in the polyamidoamine, 28.95 g) over a few minutes to a polyamidoamine prepared from adipic acid and diethylenetriamine (51.8% solids, 2.48 meq/g amine, 133.13 g) at 25° C. and stirring at 300 rpm. The temperature of the reaction mixture was increased to 35° C. over a period of 1 hour. The reaction mixture was stirred at 120 rpm for 3 hours at 35° C.

The crosslinking stage was carried out as follows. Water (164.65 g) was added to decrease reaction solids to 30%. The rate of stirring was increased to 380 rpm, and the temperature was raised to 67° C. to initiate crosslinking. After 35 minutes at 65°–67° C., the Gardner-Holdt viscosity of an aliquot at 25° C. was "C", and water (64.09 g) was added to decrease reaction solids to 25%. After 45 minutes at 55°–67° C., the Gardner-Holdt viscosity was "L-M". Water (400.02 g) and sulfuric acid (98%, 4.33 g) were added. The product had the following properties: pH 2.97, Brookfield viscosity at 25° C. of 51 cP, 12.5% solids, 1,3-dichloropropanol (DCP) content of 1298 ppm, cationic charge density at pH 10 of 1.88 meq/g, aminochlorohydrin conversion to azetidinium chloride of 81.9%, and oven cured % wet/dry effectiveness compared to the standard resin of 98.5%.

EXAMPLE 2

This example describes the preparation of a polyamidoamine/epichlorohydrin resin of this invention using trimethylamine as the amine additive.

A chlorohydrin-substituted polyamidoamine was prepared as described in Comparative Example 1.

Water (139.72 g) and trimethylamine (5 mole %, based on the amine in the polyamidoamine, 0.632 meq/g aqueous, 26.18 g) were added.

Crosslinking was carried out by increasing the rate of stirring to 380 rpm, and raising the temperature to 67° C. to initiate crosslinking. After 25 minutes at 63°–67° C., the Gardner-Holdt viscosity of an aliquot at 25° C. was "C". Water (64.62 g) was added to decrease reaction solids to 25%. After 20 minutes at 51°–65° C., the Gardner-Holdt viscosity was "L", and water (395.90 g) and sulfuric acid (98%, 5.33 g) were added. The product had the following properties: pH 2.97, Brookfield viscosity at 25° C. of 53 cP, 12.8% solids, 1,3-DCP content of 771 ppm, cationic charge density at pH 10 of 1.90 meq/g, aminochlorohydrin conversion to azetidinium chloride of 69.1% and oven cured % wet/dry effectiveness compared to the standard resin of 98.5%.

EXAMPLE 3

This example describes the preparation of a polyamidoamine/epichlorohydrin resin using trimethylamine as the amine additive and an amine additive reaction stage.

A chlorohydrin-substituted polyamidoamine was prepared as described in Comparative Example 1.

Trimethylamine (2.5 mole % based on the amount of amine in the polyamidoamine, 0.632 meq/g aqueous, 13.1 g) was added. The reaction mixture was stirred at 35° C. at 120 rpm for 1 hour.

The crosslinking step was carried out by adding water (153.9 g), increasing the rate of stirring to 380 rpm, and raising the temperature to 68° C. to initiate crosslinking. After 38 minutes at 65°–68° C. the Gardner-Holdt viscosity of an aliquot at 25° C. was "C". Water (66.0 g) was added to decrease reaction solids to 25%. After 82 minutes at 54°–65° C. the Gardner-Holdt viscosity was "M", and water (416.5 g) and sulfuric acid (98%, 4.83 g) were added. The product had the following properties: pH 2.94, Brookfield viscosity at 25° C. of 58 cP, 12.7% solids, 1,3-DCP content of 815 ppm, cationic charge density at pH 10 of 1.85 meq/g, aminochlorohydrin conversion to azetidinium chloride of 79.3%, and oven cured % wet/dry effectiveness compared to the standard resin of 99.6%.

EXAMPLE 4

This example describes the preparation of a polyamidoamine/epichlorohydrin resin using 1,4-diazabicyclo[2.2.2]octane as the amine additive.

A chlorohydrin-substituted polyamidoamine was prepared as described in Comparative Example 1.

Water (164.25 g) and 1,4-diazabicyclo[2.2.2]octane (2.5 mole % based on the amine in the polyamidoamine, 0.95 g) were added.

The crosslinking step was carried out by increasing the rate of stirring to 380 rpm, and raising the temperature to 69° C. to initiate crosslinking. After 30 minutes at 64°–69° C., the Gardner-Holdt viscosity of an aliquot at 25° C. was "C". Water (65.97 g) was added to decrease reaction solids to 25%. After 50 minutes at 50°–66° C., the Gardner-Holdt viscosity was "L+", and water (406.92 g) and sulfuric acid (98%, 5.32 g) were added. The product had the following properties: pH 2.86, Brookfield viscosity at 25° C. of 54 cP, 12.6% solids, 1,3-DCP content of 777 ppm, cationic charge density at pH 10 of 1.77 meq/g, aminochlorohydrin conversion to azetidinium chloride of 74.5%, and oven cured % wet/dry effectiveness compared to the standard resin of 90.8%.

EXAMPLE 5

This example describes the preparation of a polyamidoamine/epichlorohydrin resin using 1,4-diazabicyclo[2.2.2]octane as the amine additive and adding acid during the crosslinking stage.

A chlorohydrin-substituted polyamidoamine was prepared as described in Comparative Example 1.

Water (165.98 g) and 1,4-diazabicyclo[2.2.2]octane (2.5 mole % based on the amine in the polyamidoamine, 0.95 g) were added.

The crosslinking step was carried out by increasing the rate of stirring to 380 rpm, and raising the temperature to 67° C. to initiate crosslinking. After 30 minutes at 64°–67° C., the Gardner-Holdt viscosity of an aliquot at 25° C. was "C". Water (33.06 g) and sulfuric acid (1N, 33.08 g) were added to decrease reaction solids to 25% and to decrease pH. After 2 hours at 58°–56° C., the Gardner-Holdt viscosity was "L", and water (397.24 g) and sulfuric acid (98%, 3.76 g) were added. The product had the following properties: pH 2.96, Brookfield viscosity at 25° C. of 46 cP, 12.9% solids, 1,3-DCP content of 751 ppm, cationic charge density at pH 10 of 1.76 meq/g, aminochlorohydrin conversion to azetidinium chloride of 84.7%, and oven cured % wet/dry effectiveness compared to the standard resin of 95.8%.

COMPARATIVE EXAMPLE 6

This example describes the preparation of a polyamidoamine/epichlorohydrin resin using sodium hydroxide rather than the amine additive of this invention to control epichlorohydrin residuals.

A chlorohydrin-substituted polyamidoamine was prepared as described in Comparative Example 1.

Water (166.31 g) and sodium hydroxide (20 mole % based on the amine in the polyamidoamine, 2.64 g) were added.

The crosslinking step was carried out by increasing the rate of stirring to 380 rpm, and raising the temperature to 53° C. to initiate crosslinking. After 30 minutes at 48°–53° C. the Gardner-Holdt viscosity of an aliquot at 25° C. was "C". Water (66.23 g) was added. After 40 minutes at 48°–53° C. the Gardner-Holdt viscosity was "L", and water (411.85 g) and sulfuric acid (98%, 11.13 g) were added. The product had the following properties: pH 2.94, Brookfield viscosity at 25° C. of 63 cP, 13.2% solids, 1,3-DCP content of 845 ppm, cationic charge density at pH 10 of 0.950 meq/g, aminochlorohydrin conversion to azetidinium chloride of 46.5%, and oven cured % wet/dry effectiveness compared to the standard resin of 87.3%.

EXAMPLE 7

This example demonstrates the effectiveness of various amine additives in reducing the amount of dichloropropanols in polyamidoamine/epichlorohydrin resins prepared as described in Example 2 at a molar ratio of epichlorohydrin/polyamidoamine of 0.95:1.00. The results are given in Table 1.

In the table TEPA=tetraethylenepentamine, NH3=ammonia, AEP=N-aminoethylpiperazine, Me3N=trimethylamine, DABCO=1,4-diazabicyclo[2.2.2]octane, NMP=N-methylpyrrolidine, EN=ethylenediamine, MEA=ethanolamine, MDEA=methyldiethanolamine, Me2NH=dimethylamine, HMTA=hexamethylenetetraamine, MOR=morpholine, DETA=diethylenetriamine, MBAPA=N-methylbis(3-aminopropyl)amine, Et3N=triethylamine, HMDA=hexamethylenediamine, and DEA=diethanolamine.

TABLE 1

| Amine | Molar Ratio: Amine Additive: Amine in Polyamidoamine (%) | Dichloropropanols (normalized) (ppm) |
|---|---|---|
| TEPA | 4.99 | 673 |
| NH3 | 10.00 | 681 |
| AEP | 4.99 | 739 |
| Me3N | 5.00 | 771 |
| DABCO | 2.56 | 777 |
| NMP | 10.28 | 821 |
| EN | 5.14 | 831 |
| MEA | 10.07 | 870 |
| MDEA | 10.37 | 874 |
| Me2NH | 10.05 | 883 |
| HMTA | 2.49 | 926 |
| MOR | 4.94 | 935 |
| DETA | 2.70 | 944 |
| MBAPA | 2.54 | 983 |
| Et3N | 4.90 | 1004 |
| HMDA | 5.00 | 1000 |
| DEA | 5.13 | 1161 |
| None | 0.00 | 1298 |

EXAMPLE 8

This example compares the amount of dichloropropanols in the resin product when the process for producing the resin includes an amine additive reaction step as described in Example 3, and when the resin is made without an amine additive reaction step as described in Example 2. The data are given in Table 2. In the last section of the table, no amine was added and the dichloropropanols were measured after an additional reaction time of one hour. The molar ratio of epichlorohydrin to the amine in the polyamidoamine was 0.95:1.00.

TABLE 2

| Amine | Amine Additive Reaction Step | Molar Ratio: Amine Additive: Amine in Polyamidoamine (%) | Dichloropropanols (normalized) (ppm) |
|---|---|---|---|
| DABCO | No | 1.27 | 1002 |
| DABCO | Yes | 1.32 | 883 |
| DABCO | No | 2.56 | 777 |
| DETA | No | 2.70 | 944 |
| DETA | Yes | 2.50 | 812 |
| DETA | No | 5.02 | 828 |
| EN | No | 2.62 | 1462 |
| EN | Yes | 2.72 | 912 |
| EN | No | 5.14 | 831 |
| HMDA | No | 2.53 | 1146 |
| HMDA | Yes | 2.50 | 890 |
| HMDA | No | 5.00 | 1000 |
| MBAPA | No | 1.29 | 1123 |
| MBAPA | Yes | 1.25 | 960 |
| MBAPA | No | 2.54 | 983 |
| Me3N | No | 2.50 | 1061 |
| Me3N | Yes | 2.50 | 816 |
| Me3N | No | 5.00 | 846 |
| MOR | No | 2.64 | 1189 |
| MOR | Yes | 2.54 | 1022 |
| MOR | No | 4.94 | 935 |
| NH3 | No | 5.00 | 1264 |

TABLE 2-continued

| Amine | Amine Additive Reaction Step | Molar Ratio: Amine Additive: Amine in Polyamidoamine (%) | Dichloropropanols (normalized) (ppm) |
|---|---|---|---|
| NH3 | Yes | 5.00 | 817 |
| NH3 | No | 10.00 | 1139 |
| None | No | 0.00 | 1392 |
| None | Yes | 0.00 | 1321 |

EXAMPLE 9

This example compares the wet strengthening ability and adsorbable organic halide (AOX) content of resins made without (e.g., Example 2) and with (e.g., Example 5) the addition of a nonhalogen acid during the crosslinking step. The data are given in Table 3. AOX is an estimate of total organic halogen, which includes both epichlorohydrin residuals from the preparation of the polyamidoamine/epichlorohydrin resin, and the chlorine in aminochlorohydrin groups attached to the wet strength resin molecules.

Paper samples to be tested for tensile strength were made without the addition of wet strength resin as well as with the wet-end addition of wet strength resin. The paper pulp was a 70:30 mixture of Weyerhauser bleached hardwood kraft and Rayonier bleached kraft having a water hardness of 100 ppm, an alkalinity of 50 ppm, and a pH of 7.6. Wet strength agent was added to the wet end of the papermaking machine. The paper was dried to 4% moisture using a 45 lb/linear inch press and seven drying rolls at 150°–190° F. The basis weight of the paper was 40 lb/ream. Oven curing was carried out at 80° C. for 0.5 hr. The paper was immersed in water for two hours. Tensile tests were performed on a 6 inch span, 0.5 inch wide strips according to TAPPI method T494. Wet tensile strength and percentage retention of wet tensile strength compared to dry tensile strength ("% wet/dry") at 0.5% on pulp was interpolated from paper made with 0.25, 0.50, and 1.00% of wet strength resin vs. dry pulp. In order to reduce the impact of batch-to-batch papermaking differences on the variability of wet strength comparisons, standard wet strength resin was tested at the same time as new resins, and a percent effectiveness ratio was calculated using the wet strength data from the new resins and the results from the standard wet strength resin.

In the table "PAA Amine" is the amine in the polyamidoamine resin.

TABLE 3

| Amine | Molar Ratio: EPI: PAA Amine | Molar Ratio: Amine: PAA Amine (%) | Molar Ratio: Proton:PAA Amine (%) | Oven Cured Wet/Dry Effectiveness (%) | AOX (%) |
|---|---|---|---|---|---|
| DABCO | 0.95 | 2.56 | 0.0 | 90.8 | 0.38 |
| DABCO | 0.95 | 2.57 | 10.0 | 95.8 | |
| DETA | 0.95 | 5.02 | 0.0 | 94.4 | 0.43 |
| DETA | 0.95 | 4.99 | 10.0 | 96.6 | |
| DETA | 0.95 | 5.11 | 20.0 | 92.7 | 0.38 |
| Et3N | 0.95 | 5.03 | 0.0 | 94.9 | |
| Et3N | 0.95 | 5.18 | 10.0 | 96.0 | |
| HMTA | 0.95 | 2.49 | 0.0 | 92.1 | |
| HMTA | 0.95 | 2.53 | 10.0 | 93.2 | |
| MBAPA | 0.95 | 5.15 | 0.0 | 91.1 | |
| MBAPA | 0.95 | 5.05 | 25.1 | 92.5 | |

TABLE 3-continued

| Amine | Molar Ratio: EPI: PAA Amine | Molar Ratio: Amine: PAA Amine (%) | Molar Ratio: Proton:PAA Amine (%) | Oven Cured Wet/Dry Effectiveness (%) | AOX (%) |
|---|---|---|---|---|---|
| Me2NH | 0.95 | 10.05 | 0.0 | 96.1 | |
| Me2NH | 0.95 | 10.06 | 10.0 | 100.0 | |
| Me3N | 0.95 | 5.00 | 0.0 | 98.5 | 0.37 |
| Me3N | 0.95 | 5.00 | 10.0 | 98.7 | 0.30 |
| NH3 | 0.95 | 15.00 | 0.0 | 85.9 | |
| NH3 | 0.95 | 14.99 | 10.0 | 97.0 | |
| None | 0.90 | 0.00 | 0.0 | 95.8 | 0.32 |
| None | 0.90 | 0.00 | 5.0 | 95.5 | 0.28 |

The data show that wet strength increases and AOX decreases with the addition of acid.

It is not intended that the examples given here should be construed to limit the invention, but rather they are submitted to illustrate some of the specific embodiments of the invention. Various modifications and variations of the present invention can be made without departing from the scope of the appended claims.

I claim:

1. A process for preparing a wet strength resin for paper, said process comprising the following steps in sequence:
   (1) reacting a polyamidoamine with an epihalohydrin until the amount of unreacted epihalohydrin present is less than about 10% by weight of the amount of epihalohydrin charged,
   (2) adding a water-soluble, nonpolymeric, primary, secondary and/or tertiary amine in an amount of about 0.1 to about 50 mole %, based on the amine in the polyamidoamine, and
   (3) heating to effect crosslinking.

2. The process of claim 1, wherein the polyamidoamine is the reaction product of (a) a polyalkylene polyamine containing at least one secondary amine group and (b) a 2–12 carbon, saturated aliphatic dicarboxylic acid or a dicarboxylic acid derivative.

3. The process of claim 2, wherein the polyamidoamine is the reaction product of diethylenetriamine and adipic acid.

4. The process of claim 1, wherein the reaction in step (1) is continued until the amount of unreacted epihalohydrin present is less than about 5% of the epihalohydrin charged.

5. The process of claim 1, wherein about 50 to about 130 mole % of epihalohydrin is used per mole of amine groups in the polyamidoamine in step (1).

6. The process of claim 5, wherein about 50 to about 110% epihalohydrin is used.

7. The process of claim 6, wherein about 80 to about 100% epihalohydrin is used.

8. The process of claim 2, wherein about 50 to about 130 mole % of epihalohydrin is used per mole of amine groups in the polyamidoamine in step (1).

9. The process of claim 1, wherein the nonpolymeric amine is ammonia or an organic amine.

10. The process of claim 9, wherein the nonpolymeric amine is an organic amine.

11. The process of claim 10, wherein the organic amine is selected from the group consisting of methylamine, ethylamine, n-propylamine, isopropylamine, n-butylamine, sec-butylamine, tert-butylamine, isobutylamine, glycine, cyclohexylamine, ethanolamine, ethylmethylamine, diethylamine, dipropylamine, pyrrolidine, piperidine, dimethylamine, morpholine, diethanolamine, ethyldiethanolamine, triethylamine, methyldiethanolamine, triethanolamine, triisopropanolamine, dimethylethanolamine, trimethylamine, N-methylpyrrolidine, hexamethylenediamine, N-aminoethylpiperazine, triethylenetetraamine, tetraethylenepentaamine, 1,4-diazabicyclo[2.2.2]octane, hexamethylenetetraamine, ethylenediamine, diethylenetriamine, and N-methylbis(3-aminopropyl)amine.

12. The process of claim 11, wherein the organic amine is selected from the group consisting of trimethylamine; 1,4-diazabicyclo[2.2.2]octane, ethylenediamine, diethylenetriamine, hexamethylenediamine, and morpholine.

13. The process of claim 10, wherein the amine is a tertiary aliphatic amine.

14. The process of claim 13, wherein the amine is trimethylamine.

15. The process of claim 3, wherein the amine is trimethylamine.

16. The process of claim 1, wherein the reaction conditions for step (1) are a reaction time of about 1 to about 8 hours, a reaction temperature of about 20° to about 40° C., and reaction solids of about 40 to about 60%.

17. The process of claim 1, wherein the amount of nonpolymeric amine added is about 0.1 to about 10 mole %, based on the moles of amine in the polyamidoamine.

18. The process of claim 17, wherein the amount of nonpolymeric amine added is about 1 to about 5 mole %, based on the moles of amine in the polyamidoamine.

19. The process of claim 1, wherein an amine additive reaction stage is added after step (2).

20. The process of claim 15, wherein an amine additive reaction stage is added after step (2).

21. The process of claim 19, wherein the reaction conditions for the amine additive reaction step are a reaction time of about 1 to about 8 hours, a temperature of about 20° to about 40° C., and reaction solids of about 40 to about 60%.

22. The process of claim 1, wherein a nonhalogen acid is added during step (3).

23. The process of claim 22, wherein the nonhalogen acid has a pKa less than 5.

24. The process of claim 23, wherein the pKa is less than 4.

25. The process of claim 20, wherein a nonhalogen acid or acid salt is added during step (3).

26. The process of claim 22, wherein the acid or acid salt is selected from the group consisting of sodium bisulfate and methanesulfonic, hydroxymethanesulfonic, benzenesulfonic, toluenesulfonic, sulfamic, sulfuric, phosphoric, phosphorous, nitric, and formic acids.

27. The process of claim 22, wherein the amount of nonhalogen acid added is less than about 50 mole %, based on the moles of amine in the polyamidoamine.

28. The process of claim 27, wherein the amount of nonhalogen acid is about 1 to about 20 mole %.

29. The process of claim 28, wherein the amount of nonhalogen acid is about 5 to about 10 mole %.

30. The process of claim 1, wherein the temperature is about 40° to about 80° C. and the reaction solids are about 20 to about 40% during step (3).

31. The process of claim 1, wherein the epihalohydrin is epichlorohydrin.

32. The process of claim 25, wherein the epihalohydrin is epichlorohydrin.

33. The process of claim 1, wherein the polyamidoamine is the reaction product of a polyalkylene polyamine containing at least one secondary amine group, and a 2–12 carbon, saturated aliphatic dicarboxylic acid or a dicarboxylic acid ester; the epihalohydrin is epichlorohydrin; about 50 to about 130 mole % epichlorohydrin is used per mole of amine groups in the polyamidoamine in step (1); step (1) is continued until the amount of unreacted epihalohydrin present is less than about 5% of the epihalohydrin charged; the nonpolymeric amine is an organic amine selected from the group consisting of methylamine, ethylamine, n-propylamine, isopropylamine, n-butylamine, sec-butylamine, tert-butylamine, isobutylamine, glycine, cyclohexylamine, ethanolamine, ethylmethylamine, diethylamine, dipropylamine, pyrrolidine, piperidine, dimethylamine, morpholine, diethanolamine, ethyldiethanolamine, triethylamine, methyldiethanolamine, triethanolamine, triisopropanolamine, dimethylethanolamine, trimethylamine, N-methylpyrrolidine, hexamethylenediamine, N-aminoethylpiperazine, triethylenetetraamine, tetraethylenepentaamine, 1,4diazabicyclo[2.2.2]octane, hexamethylenetetraamine, ethylenediamine, diethylenetriamine, and N-methylbis(3-aminopropyl)amine; the amount of non polymeric amine added is about 0.1 to about 10 mole %, based on the moles of amine in the polyamidoamine; a nonhalogen acid or acid salt having a pKa of less than 5 is added during step (3), and the nonhalogen acid or acid salt is added in an amount of about 1 to about 20 mole %, based on the moles of amine in the polyamidoamine.

34. The process of claim 1, wherein the polyamidoamine is the reaction product of diethylenetriamine and adipic acid; the epihalohydrin is epichlorohydrin; about 80% to about 100% epichlorohydrin is used per mole of amine groups in the polyamidoamine in step (1); step (1) is continued until the amount of unreacted epichlorohydrin present is less than about 5% of the epichlorohydrin charged; the nonpolymeric amine is an organic amine selected from the group consisting of trimethylamine; 1,4-diazabicyclo[2.2.2]octane, ethylenediamine, diethylenetriamine, hexamethylenediamine, and morpholine; the amount of nonpolymeric amine added is about 1 to about 5 mole % based on the moles of amine in the polyamidoamine; a nonhalogen acid or acid salt selected from the group consisting of sodium bisulfate and methanesulfonic, hydroxymethanesulfonic, benzenesulfonic, toluenesulfonic, sulfamic, sulfuric, phosphoric, phosphorous, nitric, and formic acids is added during step (3), and the nonhalogen acid or acid salt is added in an amount of about 5 to about 10 mole %, based on the moles of amine in the polyamidoamine.

* * * * *